Sept. 15, 1970　　　S. W. AMBERG ET AL　　　3,528,865
METHOD OF DEEP-STRETCHING PLASTIC SHEET
MATERIAL TO RECEPTACLE SHAPE
Original Filed Dec. 4, 1964　　　　　　　　4 Sheets-Sheet 2
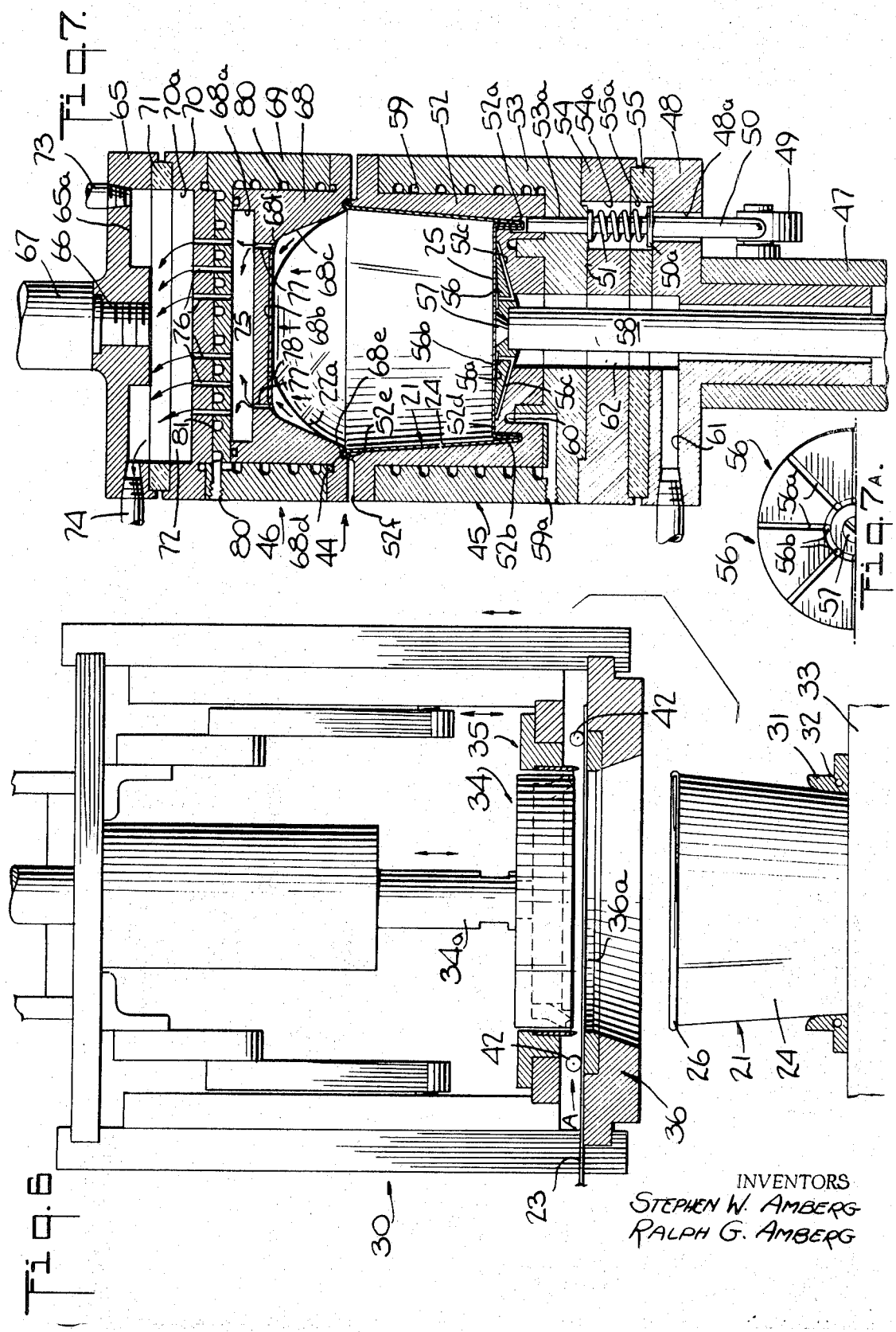
INVENTORS
STEPHEN W. AMBERG
RALPH G. AMBERG

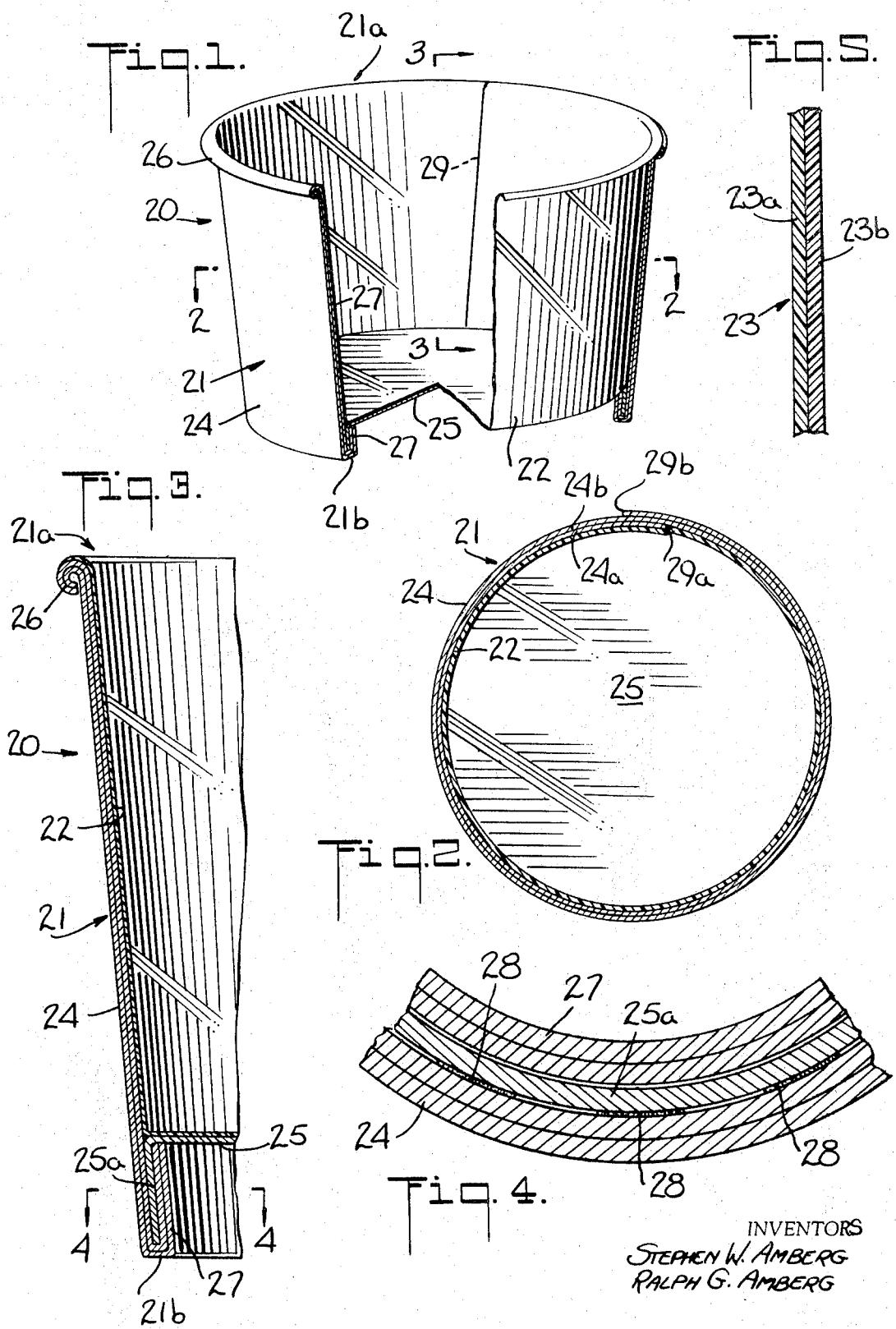

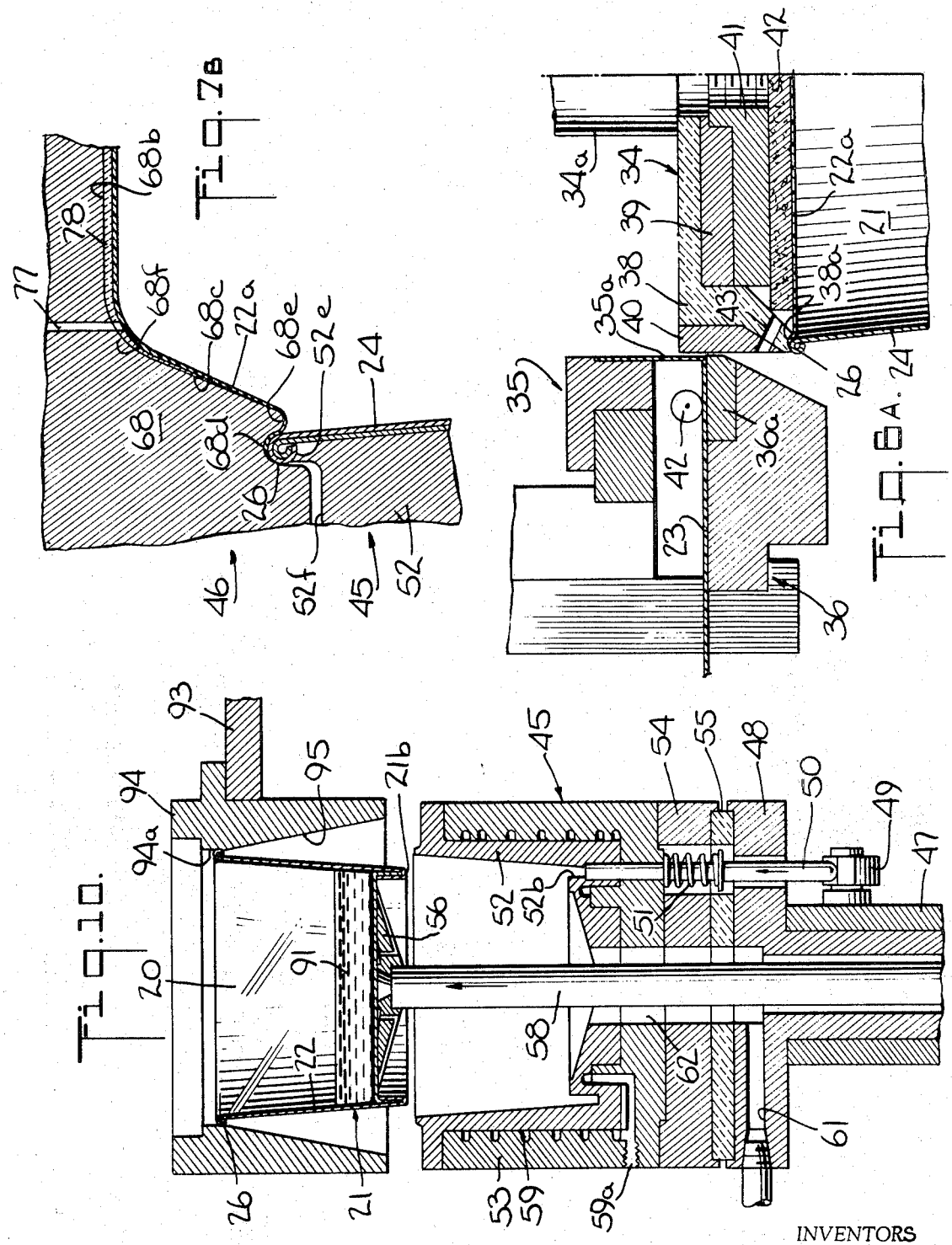

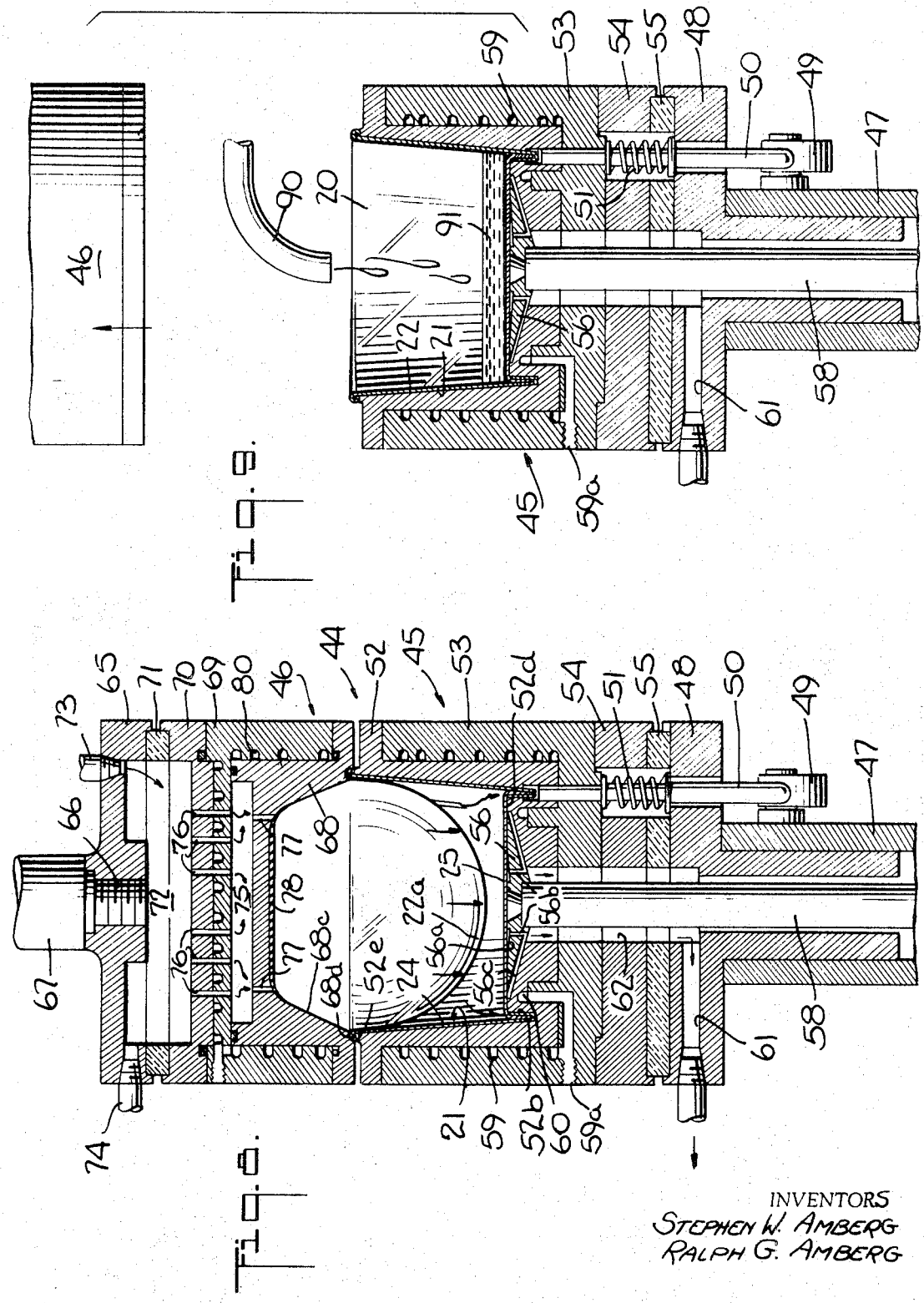

United States Patent Office 3,528,865
Patented Sept. 15, 1970

3,528,865
METHOD OF DEEP-STRETCHING PLASTIC SHEET MATERIAL TO RECEPTACLE SHAPE
Stephen W. Amberg, St. James, N.Y., and Ralph G. Amberg, Monticello, Ind., assignors, by mesne assignments, to Owens-Illinois, Inc., Toledo, Ohio, a corporation of Ohio
Original application Dec. 4, 1964, Ser. No. 415,930, now Patent No. 3,445,892, dated May 27, 1969. Divided and this application May 29, 1968, Ser. No. 740,392
Int. Cl. B29c 17/04, 27/16
U.S. Cl. 156—214                            18 Claims

ABSTRACT OF THE DISCLOSURE

Method of forming an unseamed plastic film liner for a receptacle such as a deep draft receptacle, by partially prestretching the film area in direction generally perpendicular to its plane, and then fully stretching the film in opposite direction into conforming relation with the interior of the receptacle, using heat and fluid pressure. Laminate of lower softening temperature plastic material on liner commensurately bonds liner to receptacle. Upper and lower cavity die socket apparatus for controlling shape of liner material and application of heat and fluid pressure to liner material during said forming. Receptacle having "skip seal" joint at bottom plug, and unseamed plastic film interior liner bonded thereto by other plastic material, and using said method.

---

This application is a division of copending application Ser. No. 415,930 filed Dec. 4, 1964, now Pat. No. 3,445,892.

This invention relates to receptacles, particularly those made of paper or the like, which are used as containers for comestible and non-comestible items, or as drinking cups or for other purposes. More particularly, the invention relates to the provision of full, unseamed plastic liners in such receptacles.

Although the invention may be useful in connection with shallow-draft receptacles such as trays or the like, it is particularly useful when applied to relatively deep-draft receptacles and therefore will be described in connection with such use. Moreover, and although the method and apparatus which the invention provides has been successfully employed in applying a liner of polypropylene film material to a paper container as will be described, it will be understood that other plastic film materials which are heat-stretchable might serve as the liner material, and that receptacles made of material other than paper might be provided with a plastic liner using the method and apparatus of the present invention.

In the packaging of comestible and non-comestible items, particularly those of liquid or semi-liquid consistency such as cottage cheese, fruit salad, oil, grease, solvents, acids, bases and others, and also in the provision of containers, including drinking cups, for heated items such as hot coffee, soup and the like, it is desirable that the receptacles for the goods be made of commonly employed low-cost materials such as paper or other fibrous materials, or plastic, and that the receptacles be formed using conventional techniques, such as those which provide a lapped-type seam in the receptacle body and an adhesively secured bottom closure of a familiar form. However, such commonly employed materials are not always themselves impervious to the nature of the substance to be contained and may be chemically attacked thereby, or may be relatively porous such as to absorb or permit filtering of the contained substance therethrough, or may contain even small percentages of chemical elements, used as binders or the like, which are dissolvable in the contained substance, particularly comestibles, such as to deleteriously affect the container contents. But whether or not the receptacle material is ideally impervious and otherwise suitable for use as a container, considerable difficulty has always been experienced in bonding the lapped seams, and in forming the bottom joints in such receptacles so that they do not leak.

Accordingly, it has been recognized that a full plastic interior liner, i.e., one which itself has no seams and extends continuously to cover the bottom as well as the interior wall including the bottom joint and side seam of such a receptacle, would be effective to provide an impervious and leakproof container. Hot spraying or dipping techniques for applying such a full plastic interior liner are undesirable for a number of reasons, and it is therefore desirable that the liner be applied in film form. Although preformed film liners for the purpose are known, they involve manufacturing and handling operations in addition to the step of applying the liners to the receptacles; more often do not have uniform film thickness in the formed condition; do not always properly fit into the receptacles; and in any event are not either effectively or conveniently bonded to the receptacle bodies. Moreover, techniques as have been used to form film-type plastic liners involve either expensive or not easily controlled apparatus, or apparatus which often sticks to, or causes rupture of the liner material during either the liner forming or the liner application operations.

The present invention provides a receptacle having a full and unseamed interior liner made of a plastic film, such as polypropylene, which is inert and impervious to virtually all types of substances which the receptacle might be intended to contain, and which is capable of withstanding relatively high temperatures without softening so as to further increase the range of possible uses for the receptacle. The plastic is initially in the form of a flat sheet or film and is effectively bonded to the previously and conventionally formed base receptacle in efficient and economical manner by a method and apparatus involving only heat and fluid pressure, thereby avoiding the use of a plunger or the like acting directly upon the plastic as would tend to unevenly stretch, or rupture, or stick to the liner material during the necessary step of conforming the same to the interior of the receptacle. As previously mentioned, the method and apparatus is particularly adaptable for applying such liners to deep-draft receptacles.

Briefly describing the invention in its preferred embodiment, the base receptacle which will be provided with a polypropylene plastic interior liner is a conventional, relatively deep-draft, circular container made of paper and having a convolutely wound, lapped seam type body which tapers slightly, in radially inward direction, from its mouth rim at the open top end towards the bottom end thereof. The closure which forms the flat bottom of the container has a downwardly turned peripheral skirt which is enclosed by a conventional, inwardly turned bottom skirt portion of the body. The bottom closure is adhesively secured in place, as is the longitudinally extending lapped seam of the body. However, in a modified form of the receptacle, and for a purpose as will be described, the bottom plug is secured only to the interior wall of the body by annularly spaced apart spots of adhesive, making what is known as a "skip seal" joint, rather than by full adhesive securement. The bottom skirt portion of the receptacle body is merely turned 180° inwardly, and is not adhesively secured to the inwardly facing surface of the bottom closure skirt. Because of this skirt construction the flat bottom of the receptacle, as determined by the bottom closure, is recessed upwardly so that the so-called "draw-height" of the receptacle, i.e., its interior height, is somewhat less than its overall height.

This base receptacle is provided with a full, unseamed interior liner of polypropylene which is applied in film form, the liner in the completed receptacle having substantially uniform thickness of 1½ mils (i.e., .0015″) throughout. The polypropylene material is heat-bonded to the paper receptacle using a layer or laminate of polyethylene as the adhesive. For this purpose the liner material, as initially furnished, is a sheet of non-oriented polypropoylene film having a coating or laminate of polyethylene on one side thereof, the respective thicknesses of the polypropylene and polyethylene each being 2 mils so that the total film thickness of the liner material is initially 4 mils. The polyethylene is bonded to the polypropylene in a conventional manner to initially form the 2-ply film which is used as the liner material.

Although other plastic liner materials might be used for particular applications, polypropylene was selected for use in the preferred embodiment because of its high softening point of from about 275° to 320° F., and its high tensile strength and stretchability at temperatures below its softening point. Of course, polypropylene resists most solvents and is non-porous, and for these reasons is a good liner material. Polyethylene was selected as the heat sensitive bonding material because of its lower soften point of from about 220° F. to about 265° F. (depending on the process by which it is made) as compared to the softening point of the polypropylene principal liner material, and because of the good bond which it will form with both the paper receptacle and the polypropylene liner film. Thus, a laminated film of polypropylene and polyethylene can be heated to a temperature below the comparatively high softening point of the polypropylene but at which the polyethylene is rendered very tacky, if not molten, whereupon the 2-ply sheet may be stretched and bonded by the polyethylene to paper material. It will therefore be understood that other plastic combinations might be used so long as the plastics have similar properties as compared with each other and with the material of which the base receptacle is made.

However, and heretofore, considerable difficulty has been experienced when attempting to stretch plastic liner materials to conform to the interior of receptacles, particularly those having relatively deep draft. In the present invention, a sheet of the polypropylene-polyethylene film, in unheated condition, is first blanked out to the size and shape of the receptacle mouth rim. Without heating the central area of the film which is circumscribed by the receptacle mouth rim, and with its polyethylene side facing down, the film disc is then simultaneously placed on and firmly tacked to the receptacle mouth rim, about the entire periphery thereof, by heating the peripheral film portion which is disposed on the mouth rim to a temperature above the softening point of the polyethylene.

After the film has been tacked to the receptacle mouth rim but before attempting to stretch the film, the base recepacle is itself heated to a temperature above the softening point of polyethylene but below that of polypropylene, the central area of the tacked film being left exposed so that it will be preliminary heated to some extent, and the tacked edge of the film being clamped against the receptacle mouth rim to eliminate any possibility of separation.

With the peripheral edge of the film still clamped to the receptacle mouth rim, the film is then simultaneously subjected to partial stretching in upward direction to a height which is less than the aforementioned "drawheight" of the receptacle, and to further heating in manner as will be explained. In the preferred embodiment, the final configuration of the upwardly billowed and thus prestretched and heated film is that of a dome having a flat top and a downwardly and outwardly flared sidewall periphery, the sidewall residing at substantially 70° to the horizontal and merging with the flat top in a smooth, arcuate section. The sidewall of the dome is formed by a peripheral zone of the original, flat film, the zone being of substantial width extending inwardly to a central area of the film which is only slightly smaller than the area of the flat bottom of the base receptacle and which forms the referred to flat top portion of the dome.

The manner in which the film is stretched and heated during this pre-stretching operation is such as to provide a film-thickness gradient in the referred to peripheral zone thereof from about 1½ mils immediately adjacent the receptacle mouth rim to about the thickness (i.e., 4 mils) of the original film when all of the peripheral zone is at its aforementioned angle of repose of 70° in the prestretched dome configuration, and to retain the aforementioned central area of the film at substantially its original uniform thickness throughout. The accompanying heating is such as to ultimately heat all of the pre-stretched peripheral zone of the film to a substantially uniform temperature above the softening temperature of the polyethylene, and to ultimately heat the substantially unstretched central area of the film to a substantially uniform temperature somewhat below the polyethylene softening point. However, and so as to assist in providing the referred to thickness gradient in the peripheral zone as it ultimately resides in its prestretched shape, the final temperature heat is applied to the zone in a progressive, rather than simultaneous manner during the prestretching operation, albeit the pre-stretching and heating is performed in a brief interval of time. That is, heating of the zone occurs first in the annular region immediately adjacent the receptacle mouth rim and lastly in the annular region adjacent the flat, central area of the film. These progressively heated annular elements of the zone remain in engagement with and continue to be heated by the heat source as succeeding elements come into such engagement. Although it is not actually known, it is thought that the aforementioned thickness gradient occurs in the following manner: As the film is drawn upwardly, the first annular element engages the heat source and is rendered more stretchable before the succeeding elements are heated to the same extent. The tensile strength of the film in this first elemenal region is thereby reduced below that of the remainder of the zone so that the film immediately stretches and thins in this region prior to such stretching and thinning of the elemental areas which thereafter engage the heat source. As a consequence, and perhaps also due to the slightly greater time during which the preceding elements are in engagement with the heat source, the elements as they engage the heat source are stretched and thinned to a progressively lesser extent.

The liner film is held in this pre-stretched upwardly billowed or domed condition for a period of time so as to thoroughly and uniformly heat the same to the desired respective temperatures of its peripheral and central portions. The film is then forced downwardly into the now fully heated receptacle. This downward forcing is performed entirely by fluid pressure which, in the preferred embodiment and as will be seen, is a combination of vacuum and air pressure. During the downward forcing of the heated film into the deep draft base receptacle the film will stretch and thin least within the previously stretched peripheral zone, albeit progressively more towards the center of the film in inverse proportion to the gradient-stretching and thinning within the zone as previously mentioned, and will stretch and thin considerably within the central area of the film. As a result, the film has uniform thickness of about 1½ mils as it is finally disposed on and bonded to the base receptacle. It will be noted that the polyethylene bonding material is very tacky, if not fully molten within the peripheral zone, and at least at a "tacky" temperature within the central zone of the film at the time it is initially forced into conforming relation with the interior of the receptacle, but that the heated receptacle promptly renders all areas of the polyethylene very tacky or molten upon contact.

While still exerting fluid pressure such as will keep the hot film in place, the receptacle and its now full-fitting interior liner is cooled. In the preferred embodiment, the cooling is in air, assisted by chilling with cold water poured into the receptacle to a height of about ¼". Upon cooling, the polyethylene secures the polypropylene primary liner to the receptacle.

The method of forming and bonding liners in receptacles according to the invention is conveniently carried out using apparatus as will also be described. Briefly, the apparatus comprises a film-blanking and tacking head which mounts both a knife edge having a requisite shape for blanking the film to the size and shape of the receptacle mouth rim, and a heated plunger adapted for tacking the film to the receptacle mouth rim in manner as previously mentioned. A strip of the liner film is fed across the top of a blanking die of the apparatus, which is also mounted on the head and which is at the time disposed above the receptacle. The head then moves downwardly to bring the blanking die into close proximity to and above the receptacle which is positioned in a receptacle holder below the blanking and tacking head. During the downward movement of the blanking die, the knife edge and the heated plunger move downwardly at a faster rate so that they move relative to the blanking die to first cause the knife edge to engage the blanking die so as to blank out a disc of the film, and then cause the heated plunger to carry the disc a further distance downward to position and tack the same on the receptacle mouth rim, as aforesaid.

The receptacle with the film thus tacked in place is then transferred to what is referred to herein as the lower cavity die of an upper and lower cavity die apparatus which is heated to the temperatures previously mentioned. The lower cavity die includes a vertically movable bottom plate which will subsequently be used as a receptacle ejector and which is heated to a higher temperature than the remainder of the cavity, as will be described, and apertures for drawing a vacuum within the die from in and around its bottom plate ejector.

What will be termed the upper cavity die of this apparatus operates in conjunction with the lower cavity die both to pre-stretch and to subsequently conform the heated film to the receptacle. That is, the upper cavity die has apertures through which both a vacuum will be drawn to pre-stretch the film in upward direction as aforesaid, and a subsequent pressure of air will pass to assist in fully conforming the heated film to the receptacle after the film has been drawn in downward direction by the vacuum of the lower cavity die, all as will be more fully explained. These interior apertures of the upper cavity die are disposed in spaced apart relation in a circular pattern at the top of the die, as will be seen.

The upper cavity die is of particular inverted dome-shaped configuration. In the preferred embodiment, the recessed height of the dome is about three-fifths of the "draw-height" of the receptacle, and the interior annular wall of the dome is inclined inwardly at an angle of 70° to the horizontal. The inclined wall is filleted, on a radius of ½", where it merges with the flat, centrally disposed overhead area of the dome. Although the entire upper cavity die is heated, the flat central area is partially insulated to provide a localized surface temperature thereat which is below the softening temperature of polyethylene, whereas the remainder of the interior wall of the die is maintained at a temperature above the softening temperature of polyethylene. The peripheral lower edge of the upper cavity die is shaped to accommodate, and clamp the film against the conventional beaded mouth rim of the receptacle when the upper cavity die is closed upon the lower cavity die during both the liner pre-stretching and the subsequent liner forming operations.

While the receptacle with the as yet unstretched liner material tacked in place is in the lower cavity die with the upper cavity die closed thereon, the base receptacle is heated by the lower cavity die for a relatively short period of time, as aforesaid. After the receptacle has been thus pre-heated (during which the liner material is also preliminarily heated), a vacuum is drawn through the upper cavity die to billow the liner material in upward direction and pre-stretch the same in the previously described manner. The film conforms to the inverted-dome shaped interior of the upper cavity die and is allowed to remain in this condition for a brief period of time so as to become thoroughly heated to the desired temperatures.

Thereafter, the vacuum in the upper cavity die is terminated and a vacuum is drawn through the lower cavity die to invert the billowed form of the liner material and conform the same to the interior of the base receptacle within the lower cavity die. However, during a terminal portion of the conforming operation, air pressure is introduced through the upper cavity die vacuum apertures to assure full stretching and conforming of the liner material to the receptacle interior. The air pressure is terminated after the brief forming operation, the upper cavity die is then raised to expose the now formed liner to air and, while the vacuum is still maintained in the lower cavity die, cold water is poured into the receptacle for chilling purposes as aforesaid. After a period of cooling, the receptacle is ejected from the lower die cavity, inverted to remove the cooling water, and is then in finished condition.

These and other objects, features and advantages of the invention will become more fully apparent from the following detailed description thereof when taken together with the accompanying drawings, in which:

FIG. 1 is a perspective view of a fully lined receptacle in accordance with the invention, portions thereof being broken away to better illustrate its construction;

FIG. 2 is a sectional plan view of the receptacle, the section being taken at lines 2—2 of FIG. 1;

FIG. 3 is an enlarged and fragmentary cross-sectional view of the receptacle, the section being taken as indicated by lines 3—3 in FIG. 1;

FIG. 4 is a still further enlarged and fragmentary sectional showing of the receptacle, the view being taken at lines 4—4 of FIG. 3;

FIG. 5 is a greatly enlarged cross-sectional showing of only the plastic liner material which is used to line the receptacle of FIG. 1;

FIG. 6 is a somewhat diagrammatic elevational showing, partially in cross section, of film-blanking and tacking apparatus as may be used in the first principal step of applying a liner to a receptacle in accordance with the invention;

FIG. 6A is a fragmentary and enlarged cross-sectional showing of the apparatus of FIG. 6 to illustrate its operation;

FIG. 7 is an elevational showing in cross-section of so-called upper and lower cavity die apparatus as may be used in subsequent steps in applying a liner to a receptacle in accordance with the invention, this view being also used to illustrate the second and third principal steps of the operation;

FIG. 7A is a fragmentary top plan view of a receptacle ejector plate of the apparatus of FIG. 7;

FIG. 7B is an enlarged fragmentary view in cross-section of only a corner portion of the upper cavity die of the apparatus of FIG. 7, the view also illustrating the condition of the liner material at the end of the third principal step of the operation;

FIG. 8 is a view of the apparatus of FIG. 7, but illustrating the fourth principal step of the operation;

FIG. 9 is a view of the apparatus of FIG. 7 during the fifth principal step of the operation wherein the upper and lower cavity dies are separated, only the lower cavity die being shown in cross section; and FIG. 10 is an elevational view in cross section of only the lower cavity die apparatus of FIG. 7 as it appears with further apparatus used in conjunction therewith to remove the now fully lined receptacle therefrom.

Referring first to FIG. 1, a receptacle in accordance with the invention is generally indicated by reference numeral 20. The receptacle consists of what will be referred to herein as a "base receptacle 21," of stiff paper or the like, to which a plastic liner 22 has been applied. In the preferred embodiment, the liner 22 is the laminated film material 23 which, as illustrated in FIG. 5, consists of a layer of polypropylene film 23a which will serve as the primary liner material, and a layer of polyethylene film 23b which is bonded to the polypropylene layer 23a in conventional manner and which will serve to bond the polypropylene film to the base receptacle 21, as will be described.

Considering the base receptacle 21, and although other shapes, sizes and materials may be used, it is a 12-oz. capacity, circular shaped receptacle having a tapered paper body 24 and a paper bottom closure 25. At its upper, open end 21a the base receptacle 21 has a peripherally extending beaded mouth rim 26 which is conventionally formed by outwardly turning the upper edge of the body 24. At the lower end edge 21b of the base receptacle, the receptacle body 24 is turned inwardly and upwardly to provide a bottom skirt 27 of the body which, together with the end edge 21b, encloses a downwardly turned peripheral skirt 25a of the bottom closure 25 to support the bottom closure in a well-known manner. However, and as shown in FIG. 4, the bottom closure skirt 25a is secured only along its outwardly facing peripheral surface to the adjacent, inwardly facing surface of the body 24, and the securement is by spaced apart spots of adhesive 28, such as glue type adhesive, to provide what is known as a "skip seal" bond between the two. The opposite interface between the bottom closure skirt 25a and the body skirt 27 is not adhesively secured, the skirt being merely upwardly turned and pressed against the bottom closure skirt 25a during the receptacle forming operation. As will later be more fully understood, in applying the plastic liner 22 to the interior of the base receptacle 21, it will be desired to draw a vacuum through the closed bottom of the receptacle. The skip seal provided by spots of adhesive 28, as well as the absence of adhesive securement between the bottom closure skirt 25a and the upwardly turned body skirt 27, will facilitate the drawing of the vacuum through the bottom of the base receptacle. This is especially true where the bottom closure 25 is made of air-impervious material, such as plastic, although in the preferred embodiment the bottom closure 25 is made of paper which is somewhat air-pervious and will therefore itself facilitate the drawing of the vacuum.

As illustrated in FIG. 2, the base receptacle body 24 is formed by convolutely winding a paper blank in a conventional manner to provide a two-ply body structure, the plies being respectively indicated by reference numerals 24a and 24b. The body 24 has a lapped and adhesively secured longitudinal seam which is generally indicated by reference numeral 29 in FIG. 1. Although once-around winding may be employed to provide the lapped seam, the twice-around winding as illustrated in FIG. 2 provides an inner seam 29a where the innermost ply 24a overlaps itself to become the outermost ply 24b, and an outer seam 29b where the outermost ply 24b overlaps itself at its terminal end. The inner and outer winding plies 24a, 24b may be adhesively secured together, as by gluing throughout their areas in conventional manner, and as would also include a similar adhesive bonding of the lapped seam 29.

The 12-oz. capacity base receptacle being described is considered as having relatively deep draft. Its overall height is nominally 3" and its bottom closure 25 is recessed upwardly about ½" from its lower end edge 21b so that what will be referred to as the "draw height" of the receptacle is 2½". The receptacle diameter at its mouth rim 26 is nominally 4¼", and the body 24 tapers inwardly in the downward direction to a diameter of approximately 3½" at its lower end edge 21b. However, it will be understood that receptacles having larger capacities and deeper draft heights may also be used.

Referring now to the material which is used to form the receptacle liner 22, it comprises two different materials, the first serving as the primary liner material and being a plastic in sheet or film form which is strong and stretchable at elevated temperatures, and the second serving as a heat sensitive bonding material having a softening temperature considerably below that of the primary liner material and, of course, below that of any plastic material of which the base receptacle is made. In the embodiment of the invention being described, and as illustrated in FIG. 5, the primary liner material is a sheet of cast polypropylene film 23a having a softening point within a range of from about 275° F. to 320° F. The heat sensitive bonding material is a layer 23b of medium density polyethylene, applied and bonded in extruded form to one side of the polypropylene film which has been previously treated using a corona discharge process to insure a firm bond. The polyethylene film has a softening temperature of from about 220° F. to 230° F. The two-ply laminated film material is indicated by reference numeral 23.

The respective thicknesses of the laminated film layers 23a, 23b are selected in accordance with the desired ultimate thickness of the liner 22 and the extent of stretching and consequent thinning which the material must undergo in accordance with the draw-height and diameter of the base receptacle to which it will be applied. Considering that the primary liner material is polypropylene, it has been found that an ultimate uniform thickness of 1½ mils in the formed liner 22 is desirable for most circumstances of use. Accordingly, in the liner material 23, the polypropylene film layer 23a has initial thickness of 2 mils. Further, and considering the thinning of the bonding material as will occur and the amount thereof as will be required to form a good bond between the polypropylene film 23a and the paper material of which the base receptacle 21 is made, the polyethylene film layer 23b has initial thickness of 2 mils. The total initial thickness of the film material 23 is therefore 4 mils.

Upon heating the laminated sheet 23 of these materials, it will be understood that the polyethylene ply may be rendered highly tacky or even molten while the polypropylene ply remains in its solid form. Further, at temperatures above the softening point of polyethylene but below the softening point of polypropylene, the polypropylene film is highly stretchable. Accordingly, it will be understood that other plastic film laminates wherein the different plastics which form laminated construction have dissimilar softening points might be used, so long as the plastic which is regarded as the primary liner material has the higher softening point and is heat stretchable, as well as having other characteristics which are desirable in the ultimately formed liner.

Considering now the manner in which the plastic liner 22 is formed and bonded to the base receptacle 2, reference will first be made to FIGS. 6 and 6A. Referring to FIG. 6, a disc of the liner material 23 is blanked out from a continuous sheet of the material and tacked to the beaded mouth rim 26 of the base receptacle by a film blanking and tacking apparatus as is generally indicated by reference numeral 30. During the operation the receptacle is supported in a receptacle holder 31 which may be mounted on a conveyor or turret of a production machine, the latter being only generally indicated by reference numeral 33. Further, and because as seen in FIG. 3 the receptacle adjacent its lower end edge 21b has a thickness of five plies of paper, it may be desirable to include a heating element 32 in the receptacle support 31 to preliminarily heat the bottom part of the receptacle during the film blanking and tacking operation so as to assure that the bottom joint at the interior of the receptacle ultimately becomes fully heated. However, it has been found that such preliminary heating of the bottom of the receptacle is not always necessary, and therefore the heating element 32 may usually be omitted. However, and where used, the heating element 32 is such as to heat the receptacle support 31 to a temperature of about 250° F.

The apparatus 30 includes a vertically movable and heated plunger which is generally indicated by reference numeral 34 and which is used to heat and tack the periphery of the film disc to the base receptacle 21; a vertically movable cutting die which is generally indicated by reference numeral 35; and a vertically movable backing die which is generally indicated by reference numeral 36. The backing die 36 carries a circular shaped die ring 36a of hardened steel material which has the shape, and substantially the size of the base receptacle mouth rim 26. By suitable mechanisms (not shown) these several vertically movable elements 34, 35, 36 move relative to each other as well as relative to the base receptacle 21 positioned therebelow. That is, and as shown in FIG. 6A, in blanking and tacking a disc of the liner material 23 to the base receptacle, the backing die 36 moves downwardly to bring its backing die ring 36a into the illustrated surrounding relation with respect to the mouth rim 26 of the receptacle; the cutting die 35 carries a depending circular knife 35a downwardly into cutting engagement with the backing die ring 36a to cut a disc 22a of the film from the length of film material 23 which has been previously fed therebetween; and the heated plunger 34 moves downwardly with respect to both the cutting die 35 and the backing die 36 to carry the film disc 22a through the die ring 36a and into tacking engagement with the mouth rim 26 of the base receptacle 21.

As shown by the cross-sectional showing at the left hand side of FIG. 6A, the plunger 34 carries a film transfer and tacking pad 38 which is made of aluminum and is arcuately recessed at its underside peripheral edge, as at 38a, to conform to the rounded shape of the receptacle beaded rim 26 so as to firmly hold the disc of film material 22a in engagement with the latter. The aluminum transfer and tacking pad 38 is heated by a heating element 39, which may be a disc-shaped calrod type electrical heater or the like, and is insulated by a sleeve 40 of rigid material such as Micarta. The heating element 39 is held in place by plug 41 which threads onto the plunger shaft 34a. To the underside of the plug 41 there is attached a disc of soft, heat insulating material 42, such as a layer of felt material, and it will be noted that the insulating material 42 is sufficiently large so as to extend as close to the underside edge 38a of the tacking pad 38 as possible for the purpose of shielding the central area of the film disc 22a from the heat of the pad 38 during the tacking operation. In addition, four peripherally disposed and equally spaced apart diagonal apertures 43 are formed through the pad 38 and the surrounding insulating material 40 to permit escape of air pressure from between the plunger and the film as they come into contact. Moreover, and by a slight air-siphoning effect through the apertures 43 as established by the downward movement of the plunger 34, the film will be held firmly against the underside of the plunger until contact is made with the receptacle mouth rim.

Further with respect to the construction of the film blanking and tacking head apparatus 30, while some spacing is shown in the drawing for clarity, it will be understood that the plunger pad 38 is in contiguous slidable relation with respect to the circular knife 35a of the cutting die 35, and that the size of the die opening provided by the backing die 36a substantially corresponds to the diameter of the plunger pad 38 as well as to the outer diameter of the beaded mouth rim 26 of the base receptacle.

In operation, the sheet of film material 23 is fed, by a film feeding means such as indicated by numeral 42, in the direction of the arrow A (FIG. 6) to a position above and across the opening provided by the die 36a. The film material 23 is at the time in unheated condition. As previously explained, because the polyethylene ply of the film material 23 is employed as the bonding material between the polypropylene ply and the paper material of which the base receptacle 21 is made, the polyethylene ply of the material faces downwardly.

When the film 23 has been so positioned across the die 36a, the apparatus 30 is moved downwardly to carry the backing die 36 to the aforementioned surrounding relation with respect to the mouth rim 26 of the base receptacle 21. Concurrently with this movement, the cutting die 35 moves downwardly at an initially faster rate to bring its circular knife 35a into engagement with the upper surface of the die ring 36a to sever the disc 22a from the length of film material 23. Also concurrently with the downward movement of the backing die 36, the plunger 34 moves downwardly at a rate commensurate with that of the cutting die 35 so that its film heating and tacking pad 38 engages the film disc 22a immediately after it has been severed and carries the same downwardly beyond the die ring 36a to position and tack it to the beaded mouth rim 26 of the base receptacle as illustrated in FIG. 6A. In this connection, the heating element 39 has heated the aluminum plunger pad 38 to a temperature above the softening point of the polyethylene ply 23b of the disc 22a, but below the softening point of the polypropylene ply 23a thereof. Considering that the softening point of polyethylene is about 220° F. and the minimum softening point of polypropylene is about 275° F. as aforesaid, in the preferred embodiment of the invention, the plunger pad 38 is heated to a temperature of about 250° F. The operation is such that the plunger pad 38 is in contact with the film disc 22a for only about 2½ seconds as it tacks the film periphery to the receptacle mouth rim 26, and it will be noted that the felt insulating material 42 shields the central area of the film disc 22a from the heat of the pad 38. The apparatus 30, including its components 34, 35 and 36, is then elevated to its initial position and it will be found that the disc 22a is firmly tacked to the receptacle mouth rim. The base receptacle 21 with the film disc 22a thus tacked thereon is then transferred by automatic means (not shown) to the upper and lower cavity die apparatus which is generally indicated by reference numeral 44 in FIG. 7.

The upper and lower cavity die apparatus 44 comprises a stationary lower cavity die 45 for receiving the receptacle and a co-mating upper cavity die 46 which is vertically movable with respect to the lower cavity die, as indicated in FIG. 9, to open and close the apparatus. In FIG. 7, the apparatus 44 is shown in its closed position enclosing the base receptacle 21 and its attached film disc 22a therein for the film pre-stretching and subsequent liner forming operations as will be explained. However, before proceeding with a description of these operations, the construction of each of the cavity die sections 45 and 46 will be described in detail.

Referring first to the lower cavity die 45 as shown in FIG. 7, it is mounted on a support 47 by a steel mounting plate 48. A pivotable lever 49 is mounted on the support 47 for actuation of a vertically movable receptacle knockout plunger 50 which is normally biased into its illustrated downward position by the spring 51, the spring bias acting upon the plunger shoulder 50a which rests against the mounting plate 48. The length of the plunger 50 below its shoulder 50a extends through a suitable vertical aperture 48a of the mounting plate, and its length above the shoulder 50a extends into a cylindrical aperture 52a of an aluminum die socket 52 as shown. The socket 52 fits into and is attached, as by screws (not shown), to what will be referred to as the socket heating chamber unit 53 which is also made of aluminum and which is in turn attached, as by screws (not shown), to the mounting plate 48. Between the heating chamber unit 53 and the mounting plate 48 there is a steel base plate 54 and a heat insulator 55, the latter being of Marinite or similar material. It will be noted that the upper length of the plunger 50 is slidable within the die socket aperture 52a and a similar underlying aperture 53a through the bottom of the heating chamber unit 53, and that the upper end of the spring 51 rests against the underside of the unit 53. To accommodate the spring 51, aligned and widened apertures 54a, 55a, are formed through the base plate 55 and the insulator 55, respectively, as shown. Further, it will be noted that the interior of the die socket 52 conforms to the exterior size and shape of the receptacle 51, including an annularly extending bottom groove portion 52b for receiving the downwardly projecting lower end edge 21a of the receptacle, and that the cylindrical aperture 52a projects upwardly from the underside of the die socket 52 to a terminus about mid-way along the height of the groove portion 52b. The upper end of the knock-out plunger 50 is normally disposed immediately below the bottom of the groove portion 52b, as shown. Accordingly, upon upward pivoting of the lever 49, the plunger 50 will be lifted so that its upper end enters the groove portion 52b to press positively upward against the receptacle lower edge 21a and assure its disengagement from the groove when the finished receptacle is to be ejected from the lower cavity die 45.

Further in connection with the ejection of the finished receptacle from the lower cavity die 45, the bottom of the die socket 52 is conically recessed, as at 52c, to receive a receptacle ejector plate 56 which is attached, as by a flat head screw 57, to a vertically movable ejector shaft 58 which extends upwardly through the bottom of the apparatus as shown. The upper surface of the ejector plate 56 is flat excepting for its radially extending vacuum channels 56a (see FIG. 7A) and, as does the flat head of the screw 57, normally resides within the plane of the flat bottom portion 52d of the die socket 52. Thus, and referring briefly to FIG. 10, it is seen that the ejector plate 56 will lift the finished receptacle from the lower cavity die 45 upon upward movement of the ejector shaft 58, the movement of the shaft being by suitable means (not shown).

As perhaps best shown by FIG. 7B, the upper peripheral edge of the die socket 52 is arcuately recessed, as at 52e, to receive the underside of the receptacle beaded mouth rim 26. Outwardly of this upper peripheral edge, the die socket top surface 52f is recessed downwardly to provide operating clearance between the upper and lower cavity dies, thus to assure firm contact of the upper cavity die 46 with the receptacle mouth rim.

The heating chamber unit 53 is provided with a spiral-shaped channel 59, extending throughout its height, at its interior surface which is in interfacing relationship with the die socket 52. The lower end of the channel 59 joins with a laterally extending oil inlet passage 59a through which hot oil, heated to a temperature of about 280° F. is introduced from a source (not shown) so as to enter the spiral channel 59 to heat the heating chamber unit 52. As shown in FIG. 7, the oil inlet passage 59a also introduces hot oil to a circular-shaped oil circulating channel 60 located at the underside of the die socket 52 for heating the bottom of the die socket as well as the aluminum ejector 56. An oil outlet passage from these channels (not shown) is also provided. Of course, the die socket 52 and ejector 56 might be heated by other means, such as electrical heating elements. In any event, the arrangement is such as to heat and maintain all of the interior wall surfaces of the die socket 52, including its bottom groove 52b, flat bottom portion 52d, and upper peripheral edge 52e and including ejector plate 56, to a temperature of about 250° F., although the ejector plate and lower most surfaces of the socket will probably be heated to a somewhat higher temperature, as is desired, due to the upward direction of flow of the heated oil. Of course, the socket temperature should be below 275° F., the minimum softening point of the polypropylene.

As previously mentioned, during the liner forming operation a vacuum will be drawn through the lower cavity die 45 and, for this purpose, a vacuum channel 61 is formed in the mounting plate 48 which will be connected with an exterior vacuum source (not shown). At its inner end, the vacuum channel 61 opens into a vacuum chamber, generally indicated by reference numeral 62, which is formed by suitably widened and aligned central apertures of the lower cavity die component elements 48, 52, 53, 54 and 55, as shown. As will be understood from a comparison of FIGS. 7, 7A and 10, the vacuum which is drawn through the chamber 62 and channel 61 reaches the underside of the receptacle 21 by means of the annularly spaced apart vertical vacuum channels 56b of the ejector 56 which connect respectively with the aforementioned radially extending top surface vacuum channels 56a (see FIG. 7A), and by means of the additional radially extending vacuum channels 56c formed in the underside of the ejector 56 which are respectively disposed directly under the upper surface channels 56a so that they are not visible in FIG. 7A. An additional circular-shaped vacuum channel 56d is formed in the top surface of the ejector 56 interconnecting the vacuum channels 56a as well as the vacuum channels 56b. Thus, it will be understood that a vacuum may be applied directly to the underside of the receptacle 21 via the vacuum channels 56a and 56d, and via the circular-shaped spacing (not numbered) between the outer periphery of the ejector 56 and the flat bottom portion 52d of the die socket, which spacing forms a vacuum channel to which the radially extending vacuum channels 56c connect. In this regard, it should be noted that the paper material of which the bottom closure 25 of the base receptacle 21 is made is sufficiently porous, or air-pervious, so as to permit the drawing of a vacuum therethrough.

Referring now to the construction of the upper cavity die 46, as shown in FIG. 7, it includes a steel mounting plate 65 by which it is attached, as by a threaded connection 66, to the lower end of a vertically movable shaft 67. The vertical movement of the shaft 67 (by means not shown) is for the purpose of opening and closing the apparatus 44, as indicated by a comparison of FIGS. 7 and 9 for example. The dome-shaped die socket 68, which is made of aluminum for good heat transfer, fits into and is attached, as by screws (not shown), to an upper cavity die socket heating chamber unit 69 which is also made of aluminum. The latter is, in turn, attached by screws (not shown) to the mounting plate 65, an aluminum baffle plate 70 and an insulator 71 being disposed as shown between the two. The insulator 71 is of a hard type insulating material, such as Marinite, and is ring-shaped to form a wall portion of an air and vacuum upper chamber 72. The upper wall of the interiorly located upper chamber 72 is formed by an annular recess 65a of the mounting plate 65, and its lower wall is formed by an interior recess 70a of the baffle plate 70, as indicated in FIG. 7.

An air pressure connection 73 is provided in the mounting plate 65 for admitting air to the upper chamber 72 from an air pressure source (not shown) at a particular time during the operation. A vacuum connection 74 is also provided in the mounting plate 65 for connection to an exterior vacuum means (not shown) for drawing a vacuum within the upper chamber 72 at a different time during the operation and, as in the case of the vacuum drawing means connected to the lower cavity die 45, it will be understood that the outside air pressure and vacuum sources (not shown) are suitably regulated and provided with control means for admitting air and drawing the vacuum, as the case may be, at the required times.

It will also be noted that an air and vacuum lower chamber 75, which acts as an equalizing plenum, is formed by a recess 68a between the die socket 68 and the top of the heating chamber unit 69, and that the two chambers 72, 75 are connected by a plurality of vertically disposed air and vacuum channels 76 which extend through both the heating chamber unit 69 and the baffle plate 70, as shown. The channels 76 are arranged in a circular pattern and are located at the semi-quadrant location in each of the three radially spaced apart rows thereof as indicated, and thus distribute the air and vacuum pressures more or less evenly within the lower chamber 75. The air pressure is introduced from the lower chamber 75, and vacuum is drawn within the die socket 68 via the single, circular-patterned row of twenty-four additional air and vacuum channels 77 extending through the upper wall of the socket 68. In the preferred embodiment being described, these additional channels 77 are formed by small (No. 55) drill holes spaced 15° apart on a radius of 1½ inches, which causes them to be peripherally disposed with respect to the flat central portion 68b at the top of the die socket 68, as shown. In this connection, it will be noted that a semi-insulator member 78 is attached to the top of the dome, and the channels 77 may pierce the disc-shaped semi-insulator member 78 as shown, or the insulating member 78 may have smaller diameter so that the channels 77 are adjacent its outer periphery. It should also be understood that the radius on which the channels 77 are disposed may be somewhat less so that they are located immediately inside the periphery of the flat central portion 68b.

The insulator member 78 is a sheet of paper (thickness about .020″–.030″) suitably secured, as by gluing to the flat central portion 68b of the dome. However, semi-insulating materials other than paper, such as a thin sheet of stiff plastic, or a thin sheet of asbestos, might also be used as the insulator 78.

Referring further to the interior dome shape of the die socket 68, in addition to its flat, top central portion 68b, it has a tapered sidewall 68c having a slope of 70° measured with respect to the horizontal, and a lower peripheral edge (not numbered) which includes an annularly extending arcuately recessed portion 68d for receiving the rounded top edge of the receptacle bead 26 and an annularly extending and downwardly projecting beaded portion 68e for holding the film 22a firmly against the receptacle bead 26 and which is thought to assist the film prestretching operation to be described.

The tapered sidewall 68c has, of course, truncated conical configuration and is faired into the top central portion 68b by a comparatively wide-arc fillet 68f, the fillet radius being ½″ in the embodiment being described. The dome-height of the die socket 68 is, in the described embodiment, equal to about three-fifths of the draw-height of the receptacle (i.e., the height of the lower cavity die socket 52 between its upper peripheral edge 52e and its flat bottom portion 52d). However, it is thought that a dome height in the upper cavity die socket 68 which is equal to only one-half of the draw height of the receptacle may also be satisfactory. Further, the particular angle of slope of the sloping sidewall 68c appears to be critical, at least within some range approximating 70°. That is, it appears that neither a vertical sidewall, nor a sidewall which slopes at 45° is satisfactory, although a sidewall slope of greater than 45° but less than 90° may be satisfactory depending upon the receptacle diameter-to-draw height ratio and perhaps other factors.

The upper cavity die apparatus 46 is heated by hot oil which flows at a temperature of about 280° F. through a spiral-shaped channel 80 which estends throughout the height of the chamber unit 69 at its interior surface which is adjacent the die socket 68, and through a continuously extending and circular-patterned channel 81 which is formed throughout the area of the upper surface of the chamber unit 69 where it abuts against the baffle plate 70, the oil being admitted to both these channels 80, 81 via the oil inlet passage 80a, all as indicated in FIG. 7. Of course, a hot oil source (not shown) is connected to the oil inlet passage 80a, and an oil outlet passage (not shown) is provided in the chamber unit 69 to permit circulation of the oil through the channels 80, 81. It will also be noted that other means might be used to heat the upper cavity die apparatus 46, such as electrical heater means, steam, or the like.

Referring now to the film pre-stretching and final forming operations as are performed in the upper and lower cavity die apparatus 44, the apparatus is first heated to a temperature of about 250° F. along the interior surfaces of both the upper cavity die socket 68 and the lower cavity die socket 52. The ejector plate 56 at the bottom of the lower cavity die 45 will also be heated to the temperature of the bottom region of the lower cavity die 45, i.e. equal to or slightly higher than 250° F., as aforesaid. However, the semi-insulator 78 at the top of the upper die cavity, and which actually presents the flat, top portion of the dome-shape with which the film will be in contact, will be at a surface temperature of only about 200° F.

When the apparatus 44 has been thus uniformly heated, the upper cavity die 46 is raised momentarily, and the base receptacle 21 having the film disc 22a tacked thereon is placed within the lower cavity die 45 as previously mentioned. The upper cavity die 46 is then lowered to close the apparatus on the receptacle, as illustrated by FIG. 7. The receptacle and film disc remain in this merely enclosed condition for a short period of about 2½ seconds to permit preliminary heating of the base receptacle 21, especially at its bottom closure 25 and through the five-ply thickness of material adjacent its extreme lower edge 21b. Of course, during this preheating time the film disc 22a will also be heated somewhat, and is believed to billow upwardly to some extent due to the expansion of the air within the receptacle which is entrapped by the film disc. As seen in FIG. 7B, the receptacle bead 26 and the extreme peripheral edge of the film disc 22a are enclosed by the hot, arcuately recessed peripheral edges 52e, 68d of the upper and lower cavity die sockets, and the immediately adjacent annular element of the film disc 22a is depressed and stretched somewhat by the hot, downwardly projecting beaded portion 68c of the upper cavity die socket. The polyethylene layer 23b at the underside of the film disc 22a will be rendered tacky, and the polypropylene film layer 23a will be rendered highly stretchable, and will stretch somewhat, within the narrow annular area of the film disc 22a which is in contact, or very nearly in contact with the interior surfaces 68a and 68c, respectively, of the upper cavity die socket during this preheating operation.

After the above stated interval of time, the film disc 22a is subjected to what is referred to herein as a pre-stretching operation. The film is heated to the desired temperatures throughout and pre-stretched in the upward direction by drawing it upwardly into the heated dome-shaped socket 68, the same being accomplished by the application of a vacuum at the vacuum connection 74 so as to draw a vacuum through the upper cavity die and within the vertical channels 77 of the socket 68. The vacuum is applied for a period of about 2½ seconds at a pressure of 18 inches of mercury (5.85 p.s.i.a.). The film disc 22a is thus pre-stretched into conforming relation with the side wall 68c, the curved fillet portion 68f and the semi-insulating member 78 within the socket 68, as illustrated in FIG. 7B, whereupon the peripheral zone of the film which lies against the sidewall 68c will ultimately be heated to the temperature of the sidewall, i.e. about 250° F., and the central area of the film disc which lies against the insulator member 78 will ultimately be heated to the temperature of that member, i.e. about 200° F. However, and as previously noted, the film will be heated in successive increments as it is brought into contact with the sidewall 68c, and stretched in a thickness gradient of from about 1½ mils adjacent the beaded portion 68e of the socket to its original thickness of 4 mils within the central area thereof underlying the member 78.

After thus pre-stretching and heating the film disc 22a for a period of about 2½ seconds, the film is in condition for the liner forming and applying operation which next occurs within the apparatus 44 in the manner illustrated by FIG. 8. That is, the aforementioned vacuum applied at the vacuum connection 74 of the upper cavity die 46 is terminated and, substantially simultaneously, the same amount of vacuum (18 inches of mercury) is applied to the lower cavity die 45 via the vacuum channel 61, the vacuum chamber 62, and the ejector plate vacuum channels 56a–56c, whereupon the preheated film disc 22a will be drawn downwardly and stretched into conforming relation with the interior surfaces of the base receptacle 21. It will be noted that during this liner forming operation the film disc will be stretched to the greatest extent within the central area thereof (which has been heated to only about 200° F., but which is thicker to withstand the more normally applied and therefore greater vacuum forces which occur thereat), whereas the peripheral zone of the film which has been heated to the higher temperature of 250° and which has been pre-stretched in a thickness gradient as previously described will stretch to a lesser extent. Of course, most stretching will occur at the centermost portion of the film central area, and least stretching will occur at the film periphery adjacent the beaded mouth rim 26 of the receptacle. The rate of stretching between these locations will vary and, in general, will be inversely proportional to the thickness gradient established during the pre-stretching operation so that the film will ultimately have substantially uniform thickness throughout. The vacuum within the lower cavity die 45 is maintained for about 2½ seconds. However, during the terminal ½ second of this period, while the vacuum is still being applied, air at a pressure of 35 p.s.i.g. is applied at the air pressure connection 73 of the upper cavity die 46. The air pressure traverses the upper chamber 72, channels 76, lower chamber 75, and channels 77 to emerge within the socket areas and force the film disc 22a into even tighter fitting conforming relation with the interior of the base receptacle 21. It will be noted that, although the receptacle body 24 and the aforementioned peripheral zone of the film are at a temperature of about 250° F. during the liner forming operation, the central area of the film disc 22a, which was preheated to only 200° F. will be promptly heated to a temperature of approximately 250° F. upon contact with the receptacle bottom 25 since the latter has been heated to that temperature by the ejector plate 56 and the die socket flat bottom portion 52d against which it rests. The film will therefore be rendered more stretchable within this central area so as to assure that the polyethylene adhesive layer is rendered sufficiently tacky to form a firm bond at the bottom of the receptacle and, as it is ultimately formed, the liner 22 will be stretched to a uniform thickness of about 1½ mils throughout all of its areas.

With regard to the vacuum within the lower cavity die 45 and as it is supplied through the bottom closure 25 of the base receptacle 21, it should be noted that the paper material of which the receptacle bottom is made is airpervious and the vacuum will therefore be effectively drawn therethrough. Further, the aforementioned "skipseal" formed by the spaced apart glue spots 28 at the bottom skirt portions 25a, 27 of the receptacle as well as the unglued relation between the upwardly turned receptacle bottom skirt 27 and the downwardly turned skirt 25a of the bottom closure, will permit the vacuum to be more effectively drawn through the bottom joint of the base receptacle 21 so that the liner film will be brought tightly against the joint.

After the 2½ second liner forming period, but while the vacuum within the lower cavity die 45 is still being applied, the air pressure at the air pressure connection 73 of the upper cavity die 46 is terminated, and the die apparatus 44 is then opened to cool and solidify the polyethylene which now adhesively secures the polypropylene liner to the receptacle. FIG. 9 shows the apparatus as it thus appears. Although the lower cavity die 45 continues to be heated by hot oil flowing within the oil channel 59, exposure of the liner 22 to air cools the same to below the softening temperature of the polyethylene, especially in the vicinity of the mouth rim and body portion of the receptacle. However, to speed the cooling operation, especially within the vicinity of the bottom closure 25, a water outlet 90 is moved into position above the now fully formed receptacle 20, and cool water is introduced into the receptacle therefrom to a depth of about ¼" as illustrated in FIG. 9. The water 91 chills the bottom of the receptacle, which is its hottest part, and assures firm bonding of the liner 22 to the base receptacle 21. Of course, the water 91 should be of a purified type where the lined receptacle 20 will be used to contain foodstuffs, and it is apparent that the cooling might be assisted by means other than water.

After the receptacle 20 has been thus cooled within the lower cavity die for a period of from about two to five seconds, the receptacle 20 is ejected therefrom in the manner illustrated by FIG. 10. That is, the water outlet 90 is moved away, and a receptacle receiver arm 93 is moved into position above the receptacle. The end of the arm 93 is in the form of a ring 94 having an interior ring surface 94a in which the beaded mouth rim 26 of the receptacle 20 will snugly fit. The ring 94 includes a conically tapered surface 95 which flares outwardly below the surface 94a so as to guide the receptacle 20 into snug fitting relation within the latter. Of course, the ring 94 is axially aligned with the socket 52 of the lower cavity die 45, as shown.

The ejector shaft 58 is moved upwardly to lift the ejector plate 56 and the receptacle thereon to an elevation outside of the die socket 52 as illustrated, the beaded mouth rim 26 of the receptacle then being forced into the ring surface 94a so that the receptacle will be held by the ring. Simultaneously, the arm 49 of the lower cavity die support 47 is rotated to lift the plunger 50 against the bias of its spring 51 so that its upper end enters the die socket bottom groove 52b and lifts the bottom end edge 21b of the receptacle to assure release of the latter from the die socket. When the receptacle 20 has been received by the receiver arm 93, the ejector plate 56 and plunger 50 are lowered to their initial position, and the arm 93 is moved away from the lower cavity die 45, the latter then being unobstructed for receiving another base receptacle 21 so that the apparatus 44 may repeat the film pre-stretching and liner forming operations as previously described.

The cold water 91 is then removed from the receptacle, as by pivoting the arm 93 to invert the receptacle. The receptacle 20 is now fully formed and, as removed from the arm 93, is ready for use.

It will be found that the plastic interior liner 22 is securely bonded to the base receptacle 21, and has substantially uniform thickness throughout all of its areas, the liner extending across the side seam and bottom joint of the receptacle. The thickness of the ultimately formed liner 22 may, of course, be increased by utilizing sheet film material which has greater initial thickness than has been described. Further, it is thought that the method and apparatus as has been described may be used to apply thinner liners than has been described, and to line receptacles which have other than circular shape. In addition, the method and apparatus appear useful in forming and applying liners to tapered receptacles having open bottom ends, or to open-ended cylinders, such that the portion of the liner which would otherwise be adhered to the bottom of the receptacle, as described in connection with the preferred embodiment, simply spans across the bottom opening of such receptacle or cylinder. In such instance, the bottom portion 52d of the lower cavity die 52 and the ejector plate 56 would be maintained at a temperature below the softening point of the plastic material, such as the polyethylene layer 23b, which serves as the adhesive.

Moreover, and with regard to the forming and application temperatures, and the respective temperatures of the several areas of the apparatus, it should be noted that such temperatures in particular applications may vary from those specified. That is, the plastic liner materials may have different characteristics which would affect the operating temperatures which are selected. In addition, factors such as the desired speed of the forming operations; the thickness, or the type, or the basic weight, or the moisture content of the paper or other material used in the base receptacle; the desired depth of draw of the liner material; and other factors may affect the particular temperatures selected, or the selected initial thickness of the liner film.

It is apparent, however, that a preferred embodiment of the invention has been described which achieves all of its objects.

What is claimed is:

1. The method of deep-stretching an initially flat sheet of heat stretchable plastic material to the shape of a deep-draft open-topped receptacle comprising the steps of holding said sheet along the periphery of an area thereof corresponding to that of the open top of said receptacle shape, applying fluid pressure in a first direction normal to the plane of said sheet to prestretch said area to dome-shaped configuration while heating at least a peripheral zone thereof which extends radially inward from said periphery, said heating being applied to the annularly extending elemental areas of said peripheral zone progressively in direction from said periphery towards a central zone of said area which is bounded by said peripheral zone, said progressively heated elemental areas continuing to be heated as succeeding elemental areas are so heated, discontinuing said fluid pressure in said first direction, and then applying fluid pressure in opposite direction to finally stretch said sheet area to said receptacle shape while heating at least said central zone thereof.

2. The method according to claim 1 wherein, during said prestretching step, said peripheral zone is stretched to a greater extent adjacent said periphery and to a lesser extent adjacent said central zone, thereby providing a thickness gradient therebetween.

3. The method according to claim 1 wherein said peripheral zone in its said prestretched condition is disposed at an inwardly directed angle of substantially 70° with respect to the initial plane of said sheet, and said central zone of said prestretched area has substantially flat configuration.

4. The method according to claim 3 wherein, during said prestretching step, said central zone remains substantially unstretched but is heated and maintained at a temperature which is below that of said peripheral zone.

5. The method according to claim 3 wherein the height of said dome-shaped configuration is equal to from about one-half to about three-fifths of the depth of said receptacle shape, and said dome-shaped configuration includes an annularly extending curved zone between said peripheral and central zones of said prestretched area.

6. The method of forming and applying a plastic liner to the interior of a receptacle having an open end comprising the steps of positioning and holding a sheet of plastic film on and across the periphery of said receptacle open end, said sheet comprising a first plastic material and a second plastic material disposed on that surface of the first which faces that end of the receptacle which is opposite its said open end, said second plastic material having a softening temperature which is lower than that of said first plastic material, prestretching said sheet in at least a peripheral zone thereof which extends radially inward from said periphery while applying heat to the annularly extending elemental areas of the same progressively in direction inwardly from said periphery to a temperature which is at least equal to said softening temperature of said second plastic material but below that of said first plastic material, said progressively heated elemental areas being maintained at said temperature as succeeding elemental areas are so heated, said prestretching being in direction which is normal to the plane of the sheet and towards the outside of said receptacle, and thereafter stretching said sheet in the opposite direction into conforming relation with the interior surface of said receptacle while heating all of said sheet to said temperature, whereby said second plastic material adhesively secures said first plastic material to said receptacle.

7. The method of forming and applying a plastic liner to a receptacle according to claim 6 wherein said receptacle is heated to at least said softening temperature of said second plastic material.

8. The method of forming and applying a plastic liner to a receptacle according to claim 7 wherein said opposite end of the receptacle is closed, and wherein prior to said stretching step, said closed end of the receptacle is heated to a temperature higher than the remainder of said receptacle but to a temperature below the softening temperature of said first plastic material.

9. The method of forming and applying a plastic liner to a receptacle according to claim 6 wherein, during said prestretching step, a central area of said sheet which is bounded by said peripheral zone is heated to a temperature below said softening temperature of said second plastic material.

10. The method of forming and applying a plastic liner to a receptacle according to claim 6 wherein said sheet in its said prestretched condition includes a substantially unstretched central area bounded by said peripheral zone, said peripheral zone being stretched during said prestretching step to a greater extent adjacent said periphery and to a lesser extent adjacent said central area such as to provide a thickness gradient therebetween.

11. The method of forming and applying a plastic liner to a receptacle according to claim 10 wherein said peripheral zone in its said prestretched condition is disposed at an inwardly directed angle of substantially 70° with respect to the plane of said open end of the receptacle.

12. The method of forming and applying a plastic liner to the interior of a deep draft receptacle having a closed end and a mouth rim defining an opopsite open end comprising the steps of positioning an unheated sheet of plastic film on and across said receptacle mouth rim, said sheet comprising a first plastic material and a second plastic material disposed on that surface of the first which faces said closed end of the receptacle, said second plastic material having a softening temperature which is lower than that of said first plastic material, heating said sheet adjacent the receptacle mouth rim to tack the sheet thereto, heating said receptacle to a temperature which is at least equal to the softening temperature of said second plastic material but below that of said first plastic material, applying fluid pressure and heat to said sheet to prestretch the same in direction which is normal to the plane of the sheet and towards the outside of said receptacle, said fluid pressure being applied in a manner such that said sheet is dome-shaped having height which is equal to at least one-half said draft of the receptacle and having a flat central area which is less than the area of said closed end of the receptacle and further having a peripheral zone extending between said central area of the sheet and said mouth rim of the receptacle and which is disposed at an inwardly directed angle of substantially 70° with respect to the plane of said receptacle open end, and said heat being applied in a manner such that said peripheral zone is heated to substantially said temperature of the receptacle and said central area is heated to a temperature below said softening temperature of said second plastic material, then applying fluid pressure in opposite direction to stretch said prestretched sheet into conforming relation with the interior surfaces of said receptacle, and thereafter cooling said receptacle to a temperature below said softening temperature of said second plastic material.

13. The method of forming and applying a plastic liner to the interior of a deep draft receptacle according to claim 12 wherein said cooling step includes chilling of at least said closed end of the receptacle by pouring water into the receptacle.

14. The method of forming and applying a plastic liner to the interior of a deep draft receptacle according to claim 12 wherein said receptacle is of paper material, said first plastic material is polypropylene, and said second plastic material is polyethylene.

15. The method of forming and applying a plastic liner to the interior of a deep draft receptacle according to claim 14 wherein all of the interior surfaces of said paper receptacle are heated to a temperature of at least 250° F. and, during said prestretching step, said peripheral zone of the sheet is heated to substantially said temperature of the receptacle interior surfaces.

16. The method of forming and applying a plastic liner to the interior of a deep draft receptacle according to claim 15 wherein, during said prestretching step, said central area of the sheet is heated to substantially 200° F.

17. The method of forming and applying a plastic liner to the interior of a deep draft receptacle according to claim 14 wherein said prestretching fluid pressure comprises a vacuum applied to the exterior surface of said sheet, and said stretching fluid pressure comprises a vacuum substantially equal to the first said vacuum and applied to the interior surface of said sheet.

18. The method of forming and applying a plastic liner to the interior of a deep draft receptacle according to claim 17 wherein said stretching fluid pressure further comprises air pressure applied to the exterior surface of said sheet during at least a brief, terminal portion of the time during which the second said vacuum is applied to the interior surface of said sheet.

References Cited

UNITED STATES PATENTS

| | | | |
|---|---|---|---|
| 2,917,783 | 12/1959 | Olson et al. | 264—89 |
| 2,956,723 | 10/1960 | Tritsch. | |
| 3,187,982 | 6/1965 | Underwood et al. | 156—244 X |
| 3,260,781 | 7/1966 | Lux et al. | 18—19 X |
| 3,262,808 | 7/1966 | Crooks et al. | 117—47 |
| 3,336,424 | 8/1967 | Cheney | 264—92 X |

FOREIGN PATENTS 555,219   4/1958   Canada.

JOHN T. GOOLKASIAN, Primary Examiner

R. A. KILLWORTH, Assistant Examiner

U.S. Cl. X.R.

156—215, 229, 287, 311, 312; 264—89, 92